United States Patent
Shin et al.

(10) Patent No.: US 11,794,669 B2
(45) Date of Patent: Oct. 24, 2023

(54) FASTENING STRUCTURE FOR VEHICLE

(71) Applicants: HYUNDAI MOTOR COMPANY, Seoul (KR); KIA CORPORATION, Seoul (KR); A-SUNG PLATECH CO., LTD., Hwaseong-si (KR)

(72) Inventors: Han Shin, Seoul (KR); Janghyun Cho, Seongnam-si (KR); Kyusung Park, Hwaseong-si (KR); Giung Park, Hwaseong-si (KR)

(73) Assignees: HYUNDAI MOTOR COMPANY, Seoul (KR); KIA CORPORATION, Seoul (KR); A-SUNG PLATECH CO., LTD., Hwaseong-si (KR)

( * ) Notice: Subject to any disclaimer, the term of this patent is extended or adjusted under 35 U.S.C. 154(b) by 247 days.

(21) Appl. No.: 17/405,255

(22) Filed: Aug. 18, 2021

(65) Prior Publication Data

US 2022/0055547 A1    Feb. 24, 2022

(30) Foreign Application Priority Data

Aug. 24, 2020    (KR) .................. 10-2020-0106034

(51) Int. Cl.
*B60R 13/02*    (2006.01)
*F16B 5/06*    (2006.01)

(52) U.S. Cl.
CPC .......... *B60R 13/0206* (2013.01); *F16B 5/065* (2013.01)

(58) Field of Classification Search
CPC ............................. B60R 13/0206; F16B 5/065
See application file for complete search history.

(56) References Cited

U.S. PATENT DOCUMENTS

| | | | | |
|---|---|---|---|---|
| 4,865,505 A | * | 9/1989 | Okada | B60R 13/0206 411/512 |
| 5,533,237 A | * | 7/1996 | Higgins | F16B 21/075 24/297 |
| 5,542,158 A | * | 8/1996 | Gronau | F16B 5/0657 24/297 |
| 6,381,811 B2 | * | 5/2002 | Smith | F16B 5/0614 24/295 |
| 7,360,964 B2 | * | 4/2008 | Tsuya | F16B 5/0642 24/292 |
| 10,590,968 B2 | * | 3/2020 | Benedetti | F16B 5/126 |
| 10,634,176 B2 | * | 4/2020 | Dickinson | F16B 5/0614 |
| 10,851,820 B2 | * | 12/2020 | Spearing | F16B 5/125 |
| 10,894,516 B2 | * | 1/2021 | Benedetti | F16B 5/0657 |
| 11,149,774 B2 | * | 10/2021 | Malek | F16B 5/0614 |
| 11,162,520 B2 | * | 11/2021 | Benedetti | F16B 5/126 |
| 11,433,829 B2 | * | 9/2022 | Tawada | F16B 5/07 |
| 11,440,486 B2 | * | 9/2022 | Dickinson | B60R 13/0206 |

(Continued)

FOREIGN PATENT DOCUMENTS

| | | | | |
|---|---|---|---|---|
| DE | 112018006881 T5 | * | 10/2020 | ......... B60R 13/0206 |
| DE | 102012021870 B4 | * | 9/2021 | ............. B60K 37/00 |

(Continued)

*Primary Examiner* — Dennis H Redder
*Assistant Examiner* — Melissa Ann Bonifazi
(74) *Attorney, Agent, or Firm* — LEMPIA SUMMERFIELD KATZ LLC

(57) ABSTRACT

A fastening structure for a vehicle includes an upper trim of which an outer clip inserted into a panel is formed thereon, and a lower trim of which an inner clip inserted into the outer clip is formed thereon.

20 Claims, 6 Drawing Sheets

(56) References Cited

U.S. PATENT DOCUMENTS

| | | | |
|---|---|---|---|
| 11,440,487 B2* | 9/2022 | Dickinson | F16B 5/0664 |
| 11,560,104 B2* | 1/2023 | Marquez Costa | B60R 13/0206 |
| 11,577,666 B2* | 2/2023 | Dickinson | F16B 5/065 |
| 2003/0094828 A1* | 5/2003 | Nagamoto | F16B 5/0642 |
| | | | 296/39.1 |
| 2005/0054229 A1* | 3/2005 | Tsuya | F16B 5/0642 |
| | | | 439/280 |
| 2006/0290155 A1* | 12/2006 | Smith | B60R 11/00 |
| | | | 296/29 |
| 2019/0017527 A1* | 1/2019 | Dickinson | F16B 21/075 |
| 2019/0170178 A1* | 6/2019 | Leverger | F16B 5/0642 |
| 2020/0101924 A1* | 4/2020 | Ono | B60R 21/232 |
| 2021/0276497 A1* | 9/2021 | Buczynski | B60R 13/0206 |
| 2021/0347313 A1* | 11/2021 | Marquez Costa | B60R 13/0206 |

FOREIGN PATENT DOCUMENTS

| | | | | |
|---|---|---|---|---|
| JP | 2009222108 A | * | 10/2009 | |
| KR | 803427 B1 | * | 2/2008 | |
| KR | 102310013 B1 | * | 8/2021 | |
| WO | WO-2019142649 A1 | * | 7/2019 | B60R 13/0206 |

\* cited by examiner

FASTENING STRUCTURE FOR VEHICLE

CROSS-REFERENCE TO RELATED APPLICATION

This application claims priority to and the benefit of Korean Patent Application No. 10-2020-0106034, filed on Aug. 24, 2020, the entire contents of which are incorporated herein by reference.

FIELD

The present disclosure relates to a fastening structure for a vehicle. More particularly, the present disclosure relates to a fastening structure for a vehicle capable of combining component parts.

BACKGROUND

The statements in this section merely provide background information related to the present disclosure and may not constitute prior art.

In general, a fastening structure of a vehicle component is to fix the vehicle component and the vehicle body using a separate fastener, for example, a clip of steel material or plastic material. In this way, the vehicle component and the vehicle body can be separated when the vehicle collides. Particularly, the fastening structure that engages the trim has a problem that the trim comes off the panel in the event of a side impact of the vehicle. In order to improve this, a high engagement force is required for the fastener, but when a fastener having a high engagement force is used, there is a problem that the fastener is damaged or maintainability is deteriorated when assembling.

In addition, a general clip structure is a general bonding structure between injection products, and a problem arises that the engagement force is weakened due to deformation between parts due to long-term use.

In order to improve this, a method of increasing the thickness of the fastener may be considered, but we have discovered that it is difficult to predict the performance of the fastener, so it has a problem that requires a separate design according to the vehicle type.

The above information disclosed in this Background section is only for enhancement of understanding of the background of the present disclosure, and therefore it may contain information that does not form the prior art that is already known to a person of ordinary skill in the art.

SUMMARY

The present disclosure provides a fastening structure for a vehicle that connects a vehicle component with a vehicle body without a separate fastener.

A fastening structure for a vehicle according to an exemplary form may include: an upper trim on which an outer clip is formed and configured to insert into a panel, and a lower trim on which an inner clip is formed and configured to insert into the outer clip.

A fastening space into which the inner clip is inserted may be formed inside the outer clip, and an impact absorption space may be formed between the inner clip and the outer clip when engaging the inner clip to the outer clip.

The cross-section of the impact absorption space may be 40% to 45% of the cross-section of the fastening space.

In one form, the fastening space may get narrow toward an end of the outer clip.

A recess portion may be formed at the part of the outer clip that contacts the panel.

The thickness of the recess portion may be 80% to 90% of the panel thickness.

In another form, the outer clip may include an overlap portion formed adjacent to the recess portion and configured to be inclined with respect to a vertical center line of the outer clip.

A maximum width of the fastening space may be at least twice the width of the overlap portion.

The thickness of the outer clip excluding the recess portion and the overlap portion may be 70% to 75% of the upper trim thickness.

The outer clip and the upper trim may be integrally formed by insert injection.

The inner clip and the lower trim may be integrally formed by insert injection.

A fastening structure for a vehicle according to an exemplary form may include: a panel, a first fastening structure of which an outer clip coupled to the panel is formed thereon, and a second fastening structure of which an inner clip inserted into the outer clip is formed thereon, wherein, the outer clip forms a fastening space into which the inner clip is inserted, and when the inner clip is inserted into the fastening space, an impact absorption space is formed between the inner clip and the outer clip.

The cross-section of the impact absorption space may be 40% to 45% of the cross-section of the fastening space.

In another form, a cross-section of the fastening space may have a shape in which the cross-section narrows toward an end of the outer clip.

A recess portion may be formed at the part of the outer clip that contacts the panel.

The thickness of the recess portion may be 80% to 90% of the panel thickness.

In other form, the outer clip may include an overlap portion formed adjacent to the recess portion and configured to be inclined with respect to a vertical center line of the outer clip.

A maximum width of the fastening space may be at least twice the width of the overlap portion.

The thickness of the outer clip excluding the recess portion and the overlap portion may be 70% to 75% of the thickness of the first fastening structure.

The outer clip and the first fastening structure may be integrally formed by insert injection, and the inner clip and the second fastening structure may be integrally formed by insert injection.

According to the fastening structure for a vehicle according to an exemplary form of the present disclosure, a vehicle component can be connected to the vehicle body without a separate fastener.

In addition, according to the fastening structure for a vehicle according to an exemplary form of the present disclosure, by forming a separate space capable of absorbing the impact in the event of a vehicle collision, damage to the vehicle components in the event of a collision can be prevented.

In addition, according to the fastening structure for a vehicle according to an exemplary form of the present disclosure, it is possible to engage with an elastic structure when assembling without putting a lot of effort into engage.

In addition, according to the fastening structure for a vehicle according to an exemplary form of the present disclosure, it is possible to maintain an engaging force even if a part deformation occurs due to long-term use.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
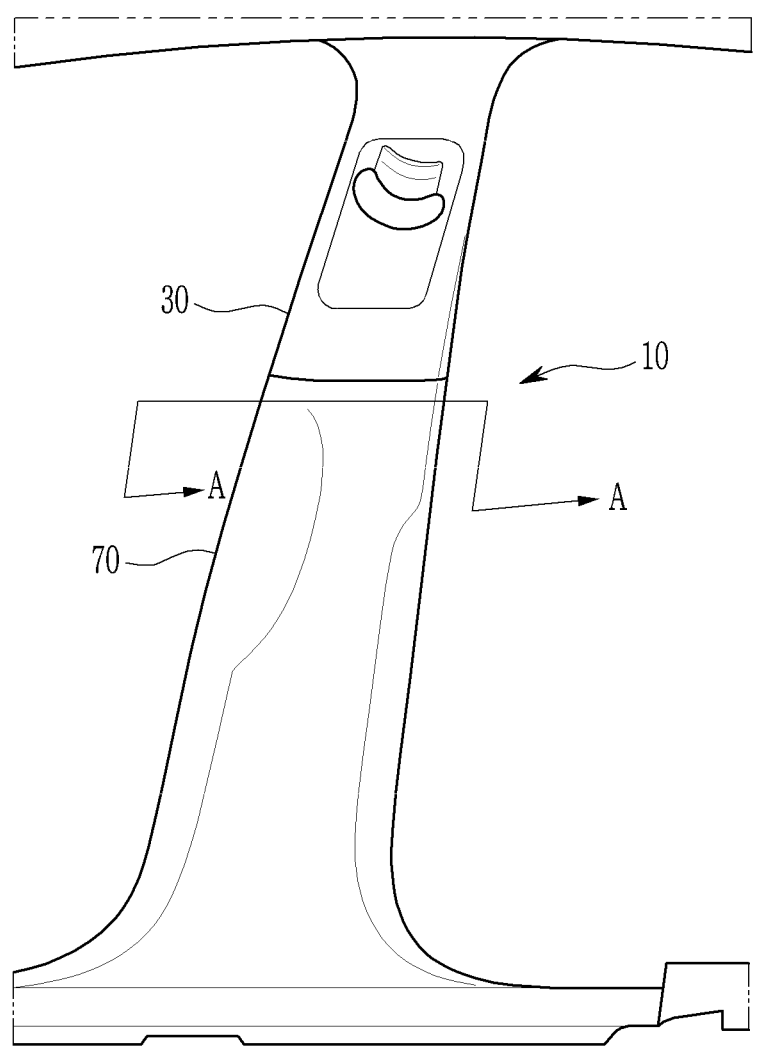
FIG. 1 is a front view of a B-pillar to which a fastening structure for a vehicle according to an exemplary form of the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following detailed description, only certain exemplary forms of the present disclosure have been shown and described, simply by way of illustration.

As those skilled in the art would realize, the described forms may be modified in various different ways, all without departing from the spirit or scope of the present disclosure Parts marked with the same reference number throughout the specification mean the same constituent elements.

In the drawings, the thickness of layers, films, panels, regions, etc., are exaggerated for clarity.

When a part such as a layer, film, region, or plate is said to be "on" another part, this includes not only the case directly above the other part, but also the case where there is another part in between.

In contrast, when an element is referred to as being "directly on" another element, there are no intervening elements present.

Throughout the specification, when a part "includes" a certain component, it means that other components may be further included rather than excluding other components unless otherwise stated.

An exemplary form of the present disclosure will hereinafter be described in detail with reference to the accompanying drawings.

FIG. 1 is a front view of a B-pillar to which a fastening structure for a vehicle according to an exemplary form of the present disclosure is applied.

A fastening structure for a vehicle according to an exemplary form of the present disclosure is described as being applied to B-pillar 10 for convenience of understanding, as being able to couple component parts to the vehicle body without a separate fastener, but is not limited thereto. Rather, it can be applied to various coupling structures in which two or more parts are stacked and fixed to the vehicle body (panel).

Figure 4:
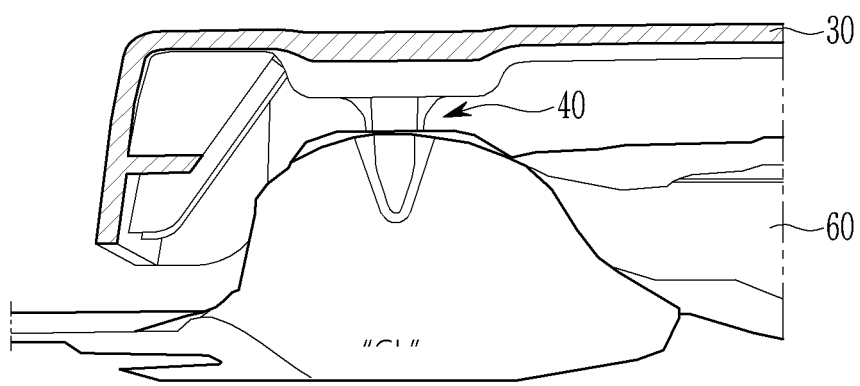
FIG. 4 and FIG. 5 is a cross-sectional view showing a method of combining an upper trim and a lower trim to which the fastening structure for a vehicle according to an exemplary form of the present disclosure.
Figure 5:
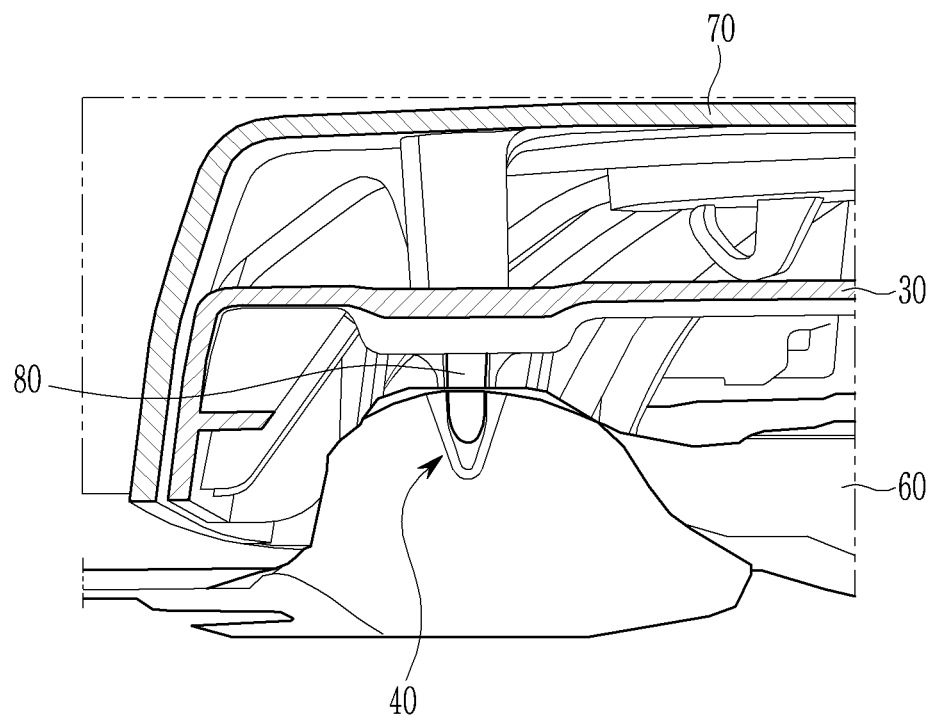

Referring to FIG. 1, a fastening structure for a vehicle according to an exemplary form of the present disclosure can be applied to a B pillar 10 in which an upper trim 30 and a lower trim 70 are combined with a panel (see 60 in FIG. 4 and FIG. 5).

Figure 2A:
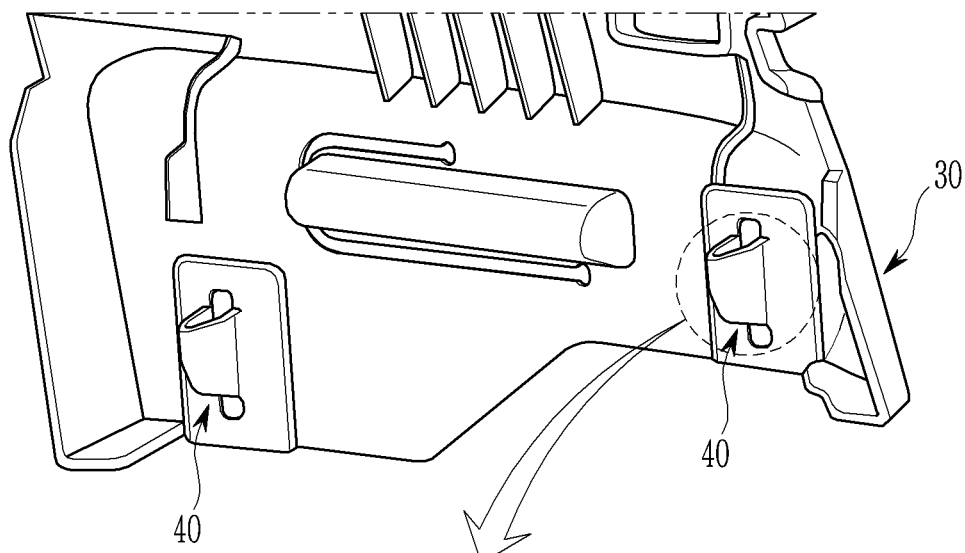
FIG. 2A is a perspective view of an upper trim to which the fastening structure for a vehicle according to an exemplary form of the present disclosure is applied.

FIG. 2A is a perspective view of an upper trim to which the fastening structure for a vehicle according to an exemplary form of the present disclosure is applied.

Figure 2B:
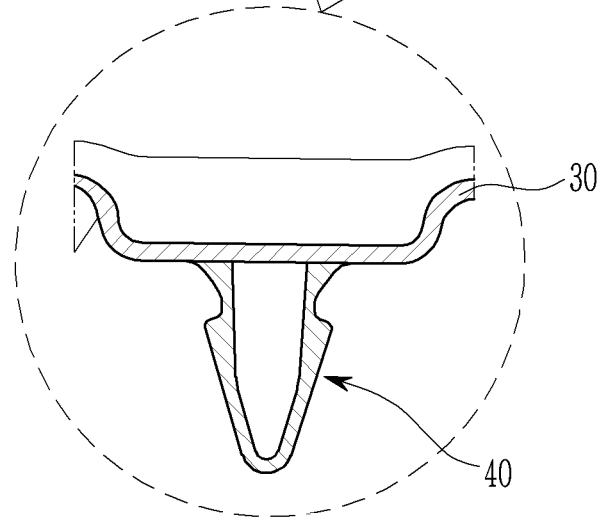
FIG. 2B is a partial cross-section view of the upper trim having a clip formed in the designated part in FIG. 2B.

Referring to FIG. 2B, an outer clip 40 is formed on an inside of the upper trim 30.

The outer clip 40 and the upper trim 30 may be integrally formed by insert injection.

Figure 3A:
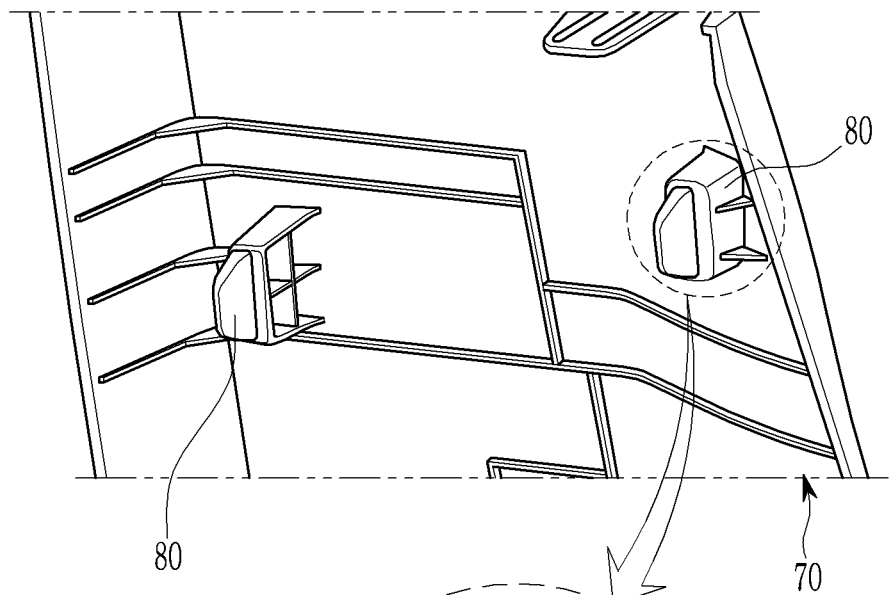
FIG. 3A is a perspective view of a lower trim to which a fastening structure for a vehicle according to an exemplary form of the present disclosure is applied.

FIG. 3A is a perspective view of a lower trim to which a fastening structure for a vehicle according to an exemplary form of the present disclosure is applied.

Figure 3B:
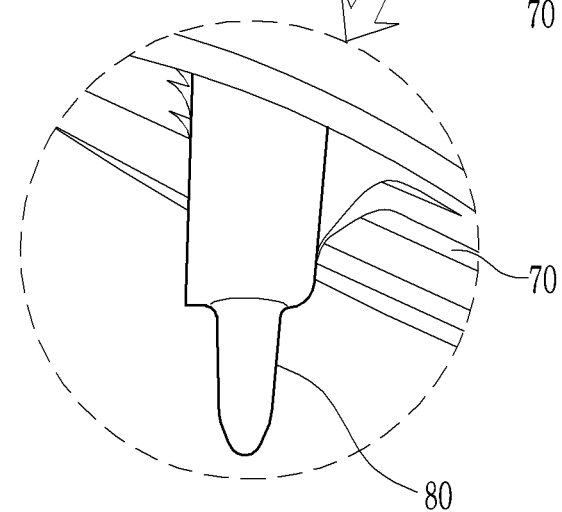
FIG. 3B is an enlarged view of a part designated in FIG. 3A.

Referring to FIG. 3B, an inner clip 80 is formed on an inside of the lower trim 70.

The inner clip 80 and the lower trim 70 may be integrally formed by insert injection.

FIG. 4 and FIG. 5 is a cross-sectional view showing a method of combining an upper trim and a lower trim to which the fastening structure for a vehicle according to an exemplary form of the present disclosure.

Referring to FIG. 1 to FIG. 5, the outer clip 40 of the upper trim 30 is inserted into the panel 60, the inner clip 80 of the lower trim 70 is inserted into the outer clip 40, and the panel 60, the upper trim 30 and the lower trim 70 are coupled without any fasteners. Thus, vehicle productivity can be improved and the entire number of parts can be reduced.

Figure 6:
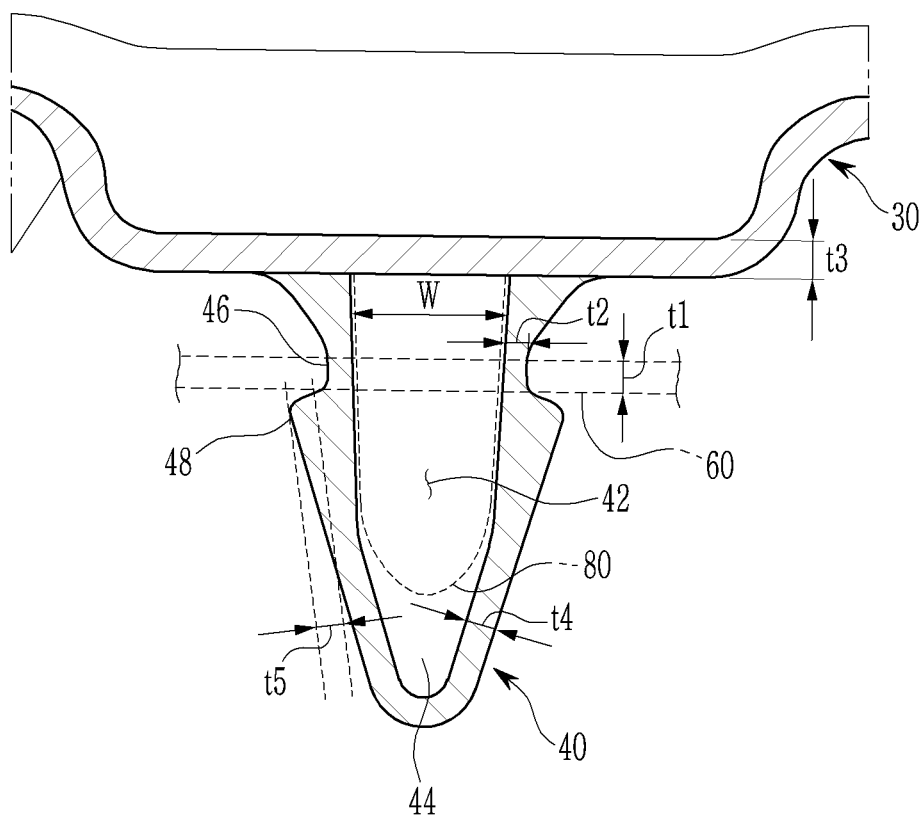
FIG. 6 is a cross-sectional view of an upper trim to which a fastening structure for a vehicle according to an exemplary form of the present disclosure is applied.

FIG. 6 is a cross-sectional view of an upper trim to which a fastening structure for a vehicle according to an exemplary form of the present disclosure is applied.

Referring to FIG. 1 to FIG. 6, a fastening space 42 into which the inner clip 80 is inserted may be formed inside the outer clip 40, and an impact absorption space 44 may be formed between the inner clip 80 and the outer clip 40 when engaging the inner clip 80 to the outer clip 40.

The cross-section of the impact absorption space 44 may be 40% to 45% of the cross-section of the fastening space 42.

The cross-section of the fastening space 42 may be defined as the cross-section of the entire inner side of the outer clip 40, and the cross-section of the impact absorption space 44 may be defined as an inner cross-section formed by the outer clip 40 and the inner clip 80.

The fastening space 42 is formed inside the outer clip 40, so when the outer clip 40 is engaged with the panel 60, the outer clip 40 is partially deformed, and the outer clip 40 is easily attached to the panel 60 even without a large force.

In the event of a vehicle collision, the outer clip 40 is deformed by the impact absorption space 44 and can absorb the impact.

That is, if the vehicle body is deformed due to a collision, there is room for the outer clip 40 to be deformed by the impact absorption space 44 between the outer clip 40 and the inner clip 80, and time that the impact is transmitted to the inner clip 80 is delayed, and the amount of impact can be reduced.

If the cross-section of the impact absorption space 44 exceeds 45% of the cross-section of the fastening space 42, the amount of deformation at impact becomes excessive and the outer clip 40 may be damaged. On the other hand, when the cross-section of the impact absorption space 44 is less than 40% of the cross-section of the fastening space 42, the impact absorption function may not be able to delay the impact time. In addition, the shrinkage direction of the outer clip 40 may be changed, which may adversely affect the heat-resistant shrinkage robustness described later.

The outer clip 40 of the fastening structure for a vehicle according to an exemplary form of the present disclosure is a form in which the inner side is emptied, and when engaging the panel 60, the engagement force can be reduced. That is, when assembling the outer clip 40 to the panel 60, a partial deformation of the outer clip 40 is possible, so assemble can be facilitated.

Also, after assemble the outer clip 40 to the panel 60, the inner clip 80 is inserted into the outer clip 40 to fill the empty space of the outer clip 40, thereby increasing the fixing force. That is, the inner clip 80 supports the side of the outer clip 40 to increase the fixing force.

The outer clip 40 and the inner clip 80 may undergo thermal deformation during manufacture or during use. That is, in the case of the inner clip 80, thermal deformation may occur in the left and right sides of FIG. 6, and the outer clip 40 may have thermal deformation in the inner direction.

In the case of a fastening structure for a vehicle according to an exemplary form of the present disclosure, since the inner clip 80 is press-fit into the outer clip 40, the fixing force of the outer clip 40 and the inner clip 80 can be maintained, and it may be easy to manage the gap between the upper trim 30 and the lower trim 70.

The fastening space 42 is a shape that narrows the cross-section toward its end, making it easier to engage the outer clip 40 with the panel 60, and inserting the inner clip 80 into the fastening space 42 easily.

A recess portion 46 may be formed at the portion of the outer clip 40 that contacts the panel 60.

The thickness t2 of the recess portion 46 can be 80% to 90% of the thickness t1 of the panel 60. The recess portion 46 is concave inward so that the position with respect to the panel 60 is fixed when assembling. And it is a part where impact is applied to the panel 60, and strength of a certain part must be secured when assembling. Therefore, it is appropriate that the thickness t2 of the recess portion 46 may be set in the range of 80%-90% compared to the thickness t1 of the panel 60 so that damage may be prevented.

In one form, the outer clip 40 includes an overlap portion 48 formed adjacent to the recess portion 46, and the overlap portion 48 may be inclined toward the end of the fastening space 42. In one form, the overlap portion 48 may be inclined with respect to a vertical center line "CL" (in FIG. 4) of the outer clip 40. The overlap portion 48 is a portion that overlaps the panel 60, and the engage force can be adjusted according to the width t5 of the overlap portion 48.

A maximum width W of the fastening space 42 may be more than twice the width t5 of the overlap portion 48. The maximum width W of the fastening space 42 can be set to be more than twice the width t5 of the overlap portion 48 in order to smooth the elastic role when assembling to the panel 60.

The thickness t4 of the outer clip 40 excluding the recess portion 46 and the overlap portion 48 may be 70% to 75% of the upper trim thickness t3.

The thickness t4 of the outer clip 40 should be set to a thickness in which no sink occurs, considering the formability of the outer clip 40, and it is suitable to be set in the range of 70% to 75% of the upper trim thickness t3.

For example, the upper trim thickness t3 may be about 2.0 mm, and the thickness t4 of the outer clip 40 may be 1.4 to 1.5 mm, but is not limited thereto.

In FIG. 1 to FIG. 6, it has been described that the fastening structure for a vehicle according to an exemplary form of the present disclosure is applied to the B-pillar 10, but is not limited thereto.

For example, an exemplary form of a fastening structure for a vehicle according to the present disclosure is also applied to various fastening structures in which two or more parts are overlapped and fixed to the vehicle body (panel), such as an A pillar, a C pillar, a door pocket, a center facia, etc.

That is, the fastening structure for a vehicle according to an exemplary form of the present disclosure may include a panel, for example, a panel forming a body (see 60 in FIGS. 4 and 5), a first fastening structure 30 of which the outer clip 40 coupled to the panel 60 is formed thereon, and a second fastening structure 70 of which the inner clip 80 inserted into the outer clip 40 is formed thereon.

And a fastening space 42 into which the inner clip 80 is inserted is formed inside the outer clip 40, and an impact absorption space 44 is formed between the inner clip 80 and the outer clip 40 when engaging the inner clip 80 to the outer clip 40.

The outer clip 40 and the first fastening structure 30 may be integrally formed by insert injection, and the inner clip 80 and the second fastening structure 70 may be integrally formed by insert injection.

The thickness of the outer clip 40 can be 70% to 75% of the thickness of the first fastening structure 30.

As described for the fastening structure for a vehicle according to an exemplary form of the present disclosure applied to the B-pillar 10, repeated descriptions of the same configuration and function will be omitted.

As described above, according to the fastening structure for a vehicle, the vehicle component can be connected to the vehicle body without a separate fastener.

In addition, according to the fastening structure for a vehicle, by forming a separate space capable of absorbing the impact in the event of a vehicle collision, damage to the vehicle components can be prevented.

In addition, according to the fastening structure for a vehicle, it is possible to fasten without putting a lot of force on fastening due to an elastic structure during assembly.

In addition, according to the fastening structure for a vehicle, it is possible to maintain an engaging force even if a part deformation occurs due to long-term use.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the appended claims.

<Description of symbols>

10: B pillar
40: outer clip
44: impact absorption space
48: overlap portion
70: lower trim
30: upper trim
42: fastening space
46: recess portion
60: panel
80: inner clip.

What is claimed is:

1. A fastening structure for a vehicle, comprising:
an upper trim on which an outer clip is formed and configured to insert into a panel; and
a lower trim on which an inner clip is formed and configured to insert into the outer clip.

2. The fastening structure of claim 1, wherein:
a fastening space into which the inner clip is inserted is formed inside the outer clip; and
an impact absorption space is formed between the inner clip and the outer clip when engaging the inner clip to the outer clip.

3. The fastening structure of claim 2, wherein a cross-section of the impact absorption space is 40% to 45% of a cross-section of the fastening space.

4. The fastening structure of claim 2, wherein the fastening space gets narrow toward an end of the outer clip.

5. The fastening structure of claim 2, wherein a recess portion is formed at a part of the outer clip that contacts the panel.

6. The fastening structure of claim 5, wherein a thickness of the recess portion is 80% to 90% of a thickness of the panel.

7. The fastening structure of claim 5, wherein the outer clip includes an overlap portion formed adjacent to the recess portion and configured to be inclined with respect to a vertical center line of the outer clip.

8. The fastening structure of claim 7, wherein a maximum width of the fastening space is at least twice a width of the overlap portion.

9. The fastening structure of claim 7, wherein a thickness of the outer clip excluding the recess portion and the overlap portion is 70% to 75% of a thickness of the upper trim.

10. The fastening structure of claim 1, wherein the outer clip and the upper trim are integrally formed by insert injection.

11. The fastening structure of claim 1, wherein the inner clip and the lower trim are integrally formed by insert injection.

12. A fastening structure for a vehicle comprising:
a panel;
a first fastening structure including an outer clip coupled to the panel; and
a second fastening structure including an inner clip configured to insert into the outer clip,
wherein:
the outer clip forms a fastening space into which the inner clip is inserted, and
when the inner clip is inserted into the fastening space, an impact absorption space is formed between the inner clip and the outer clip.

13. The fastening structure of claim 12, wherein a cross-section of the impact absorption space is 40% to 45% of a cross-section of the fastening space.

14. The fastening structure of claim 12, wherein a cross-section of the fastening space corresponds to a shape in which the cross-section narrows toward an end of the outer clip.

15. The fastening structure of claim 12, wherein a recess portion is formed at a part of the outer clip that contacts the panel.

16. The fastening structure of claim 15, wherein a thickness of the recess portion is 80% to 90% of a thickness of the panel.

17. The fastening structure of claim 15, wherein the outer clip includes an overlap portion formed adjacent to the recess portion and configured to be inclined with respect to a vertical center line of the outer clip.

18. The fastening structure of claim 17, wherein a maximum width of the fastening space is at least twice a width of the overlap portion.

19. The fastening structure of claim 17, wherein a thickness of the outer clip excluding the recess portion and the overlap portion is 70% to 75% of a thickness of the first fastening structure.

20. The fastening structure of claim 12, wherein;
the outer clip and the first fastening structure are integrally formed by insert injection; and
the inner clip and the second fastening structure are integrally formed by insert injection.

* * * * *